United States Patent
Yamaki (10) Patent No.: US 10,158,770 B1
(45) Date of Patent: Dec. 18, 2018

(54) IMAGE FORMING APPARATUS AND CONTROL METHOD FOR GENERATING PRINTING IMAGE INFORMATION

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Koji Yamaki, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/698,769

(22) Filed: Sep. 8, 2017

(51) Int. Cl.
H04N 1/40 (2006.01)
H04N 1/00 (2006.01)
H04N 1/21 (2006.01)

(52) U.S. Cl.
CPC ..... H04N 1/00037 (2013.01); H04N 1/00039 (2013.01); H04N 1/00408 (2013.01); H04N 1/00824 (2013.01); H04N 1/2104 (2013.01); H04N 2201/0081 (2013.01)

(58) Field of Classification Search
None
See application file for complete search history.

(56) References Cited

U.S. PATENT DOCUMENTS

| 6,023,342 A * | 2/2000 | Yanagida | H04N 1/00127 358/1.15 |
|---|---|---|---|
| 7,889,405 B2 | 2/2011 | Takami et al. | |
| 8,649,601 B1 * | 2/2014 | Ray | G06K 9/2063 382/100 |
| 9,278,557 B2 | 3/2016 | Honda | |
| 9,824,604 B2 * | 11/2017 | Venable | G09B 7/06 |
| 9,860,398 B2 * | 1/2018 | Shimada | G06K 9/2081 |
| 2003/0086116 A1 * | 5/2003 | Hall | G06K 17/0032 358/1.15 |
| 2006/0290999 A1 * | 12/2006 | Ebitani | G09B 7/02 358/426.06 |
| 2014/0078565 A1 * | 3/2014 | Fujiwara | G03G 15/5062 358/505 |
| 2017/0064112 A1 * | 3/2017 | Kobayashi | H04N 1/00689 |
| 2017/0155778 A1 | 6/2017 | Nakane et al. | |
| 2018/0061263 A1 * | 3/2018 | Nishihara | G09B 7/02 |

FOREIGN PATENT DOCUMENTS

JP 2006-166214 6/2006

\* cited by examiner

*Primary Examiner* — Dung D Tran
(74) *Attorney, Agent, or Firm* — Amin, Turocy & Watson LLP (57) ABSTRACT

An image forming apparatus of the embodiment includes an image reading unit, a synthetic data generating unit, an image forming control unit, and a printer. The image reading unit reads an image on a sheet. The synthetic data generating unit obtains a check box to be used for determining pattern information to be added to the sheet and a management number for identifying image information from the image of the read sheet and obtains the pattern information based on the check box and the management number. The image forming control unit generates printing image information in which the pattern information is added to the image of the read sheet. The printer performs image formation based on the printing image information.

18 Claims, 7 Drawing Sheets

IMAGE FORMING APPARATUS AND CONTROL METHOD FOR GENERATING PRINTING IMAGE INFORMATION

FIELD

Embodiments described herein relate generally to an image forming apparatus and an image forming method.

BACKGROUND

In a case of scoring a test using an image forming apparatus, the image forming apparatus scans answer sheets physically written by students or the like. The image forming apparatus reads the answer sheets by an optical character recognition (OCR) function so as to facilitate the scoring. However, with the OCR function, it is difficult to read handwritten answers, and the recognition accuracy rate is not high. Therefore, in the image forming apparatus, there is a case that a reading error occurs with high probability.

DETAILED DESCRIPTION

An image forming apparatus of the embodiment includes an image reading unit, a synthetic data generating unit, an image forming control unit, and a printer. The image reading unit reads an image on a sheet. The synthetic data generating unit obtains a check box to be used for determining pattern information to be added to the sheet and a management number for identifying image information from the image of the read sheet and obtains the pattern information based on the check box and the management number. The image forming control unit generates printing image information in which the pattern information is added to the image of the read sheet. The printer performs image formation based on the printing image information.

Figure 1:
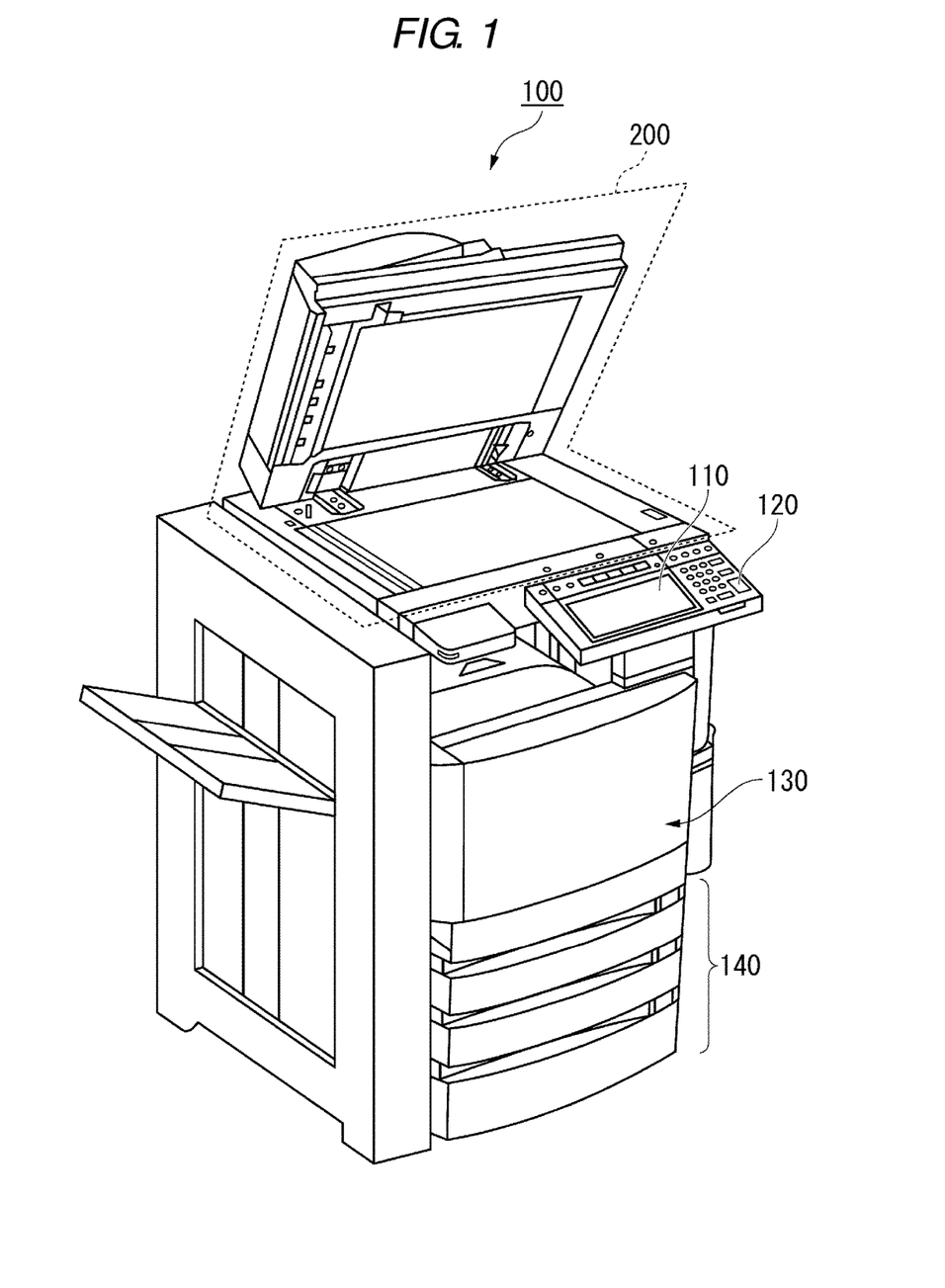
FIG. 1 is an external view showing an overall configuration example of an image forming apparatus of an embodiment.

FIG. 1 is an external view showing an overall configuration example of the image forming apparatus 100 of the embodiment. The image forming apparatus 100 is, for example, a multi-function peripheral. The image forming apparatus 100 includes a display 110, a control panel 120, a printer 130, a sheet accommodating unit 140, and an image reading unit 200. The printer 130 is a device for fixing a toner image.

The image forming apparatus 100 forms an image on a sheet using a developer such as a toner. The sheet is, for example, paper or label paper. The sheet may be anything as long as the image forming apparatus 100 can form an image on the surface thereof.

The display 110 is an image display device such as a liquid crystal display or an organic Electro Luminescence (EL) display. The display 110 displays various information on the image forming apparatus 100.

The control panel 120 has a plurality of buttons. The control panel 120 accepts a user's operation. The control panel 120 outputs a signal corresponding to the operation performed by the user to a control unit of the image forming apparatus 100. The display 110 and the control panel 120 may be configured as an integral touch panel.

The printer 130 forms an image on the sheet based on the image information generated by the image reading unit 200 or the image information received via a communication path. The printer 130 forms an image by the following processing, for example. An image forming unit of the printer 130 forms an electrostatic latent image on a photoconductive drum based on the image information. The image forming unit of the printer 130 forms a visible image by attaching the developer to the electrostatic latent image. A specific example of the developer is a toner. A transfer unit of the printer 130 transfers the visible image onto the sheet. A fixing unit of the printer 130 fixes the visible image on the sheet by applying heat and pressure to the sheet. The sheet on which the image is formed may be a sheet accommodated in the sheet accommodating unit 140 or a sheet manually fed.

The sheet accommodating unit 140 accommodates sheets used for image formation in the printer 130.

The image reading unit 200 reads the image information to be read by the intensity of light. The image reading unit 200 records the read image information. The recorded image information may be transmitted to another information processing device via a network. The recorded image information may be imaged on the sheet by the printer 130.

Figure 2:
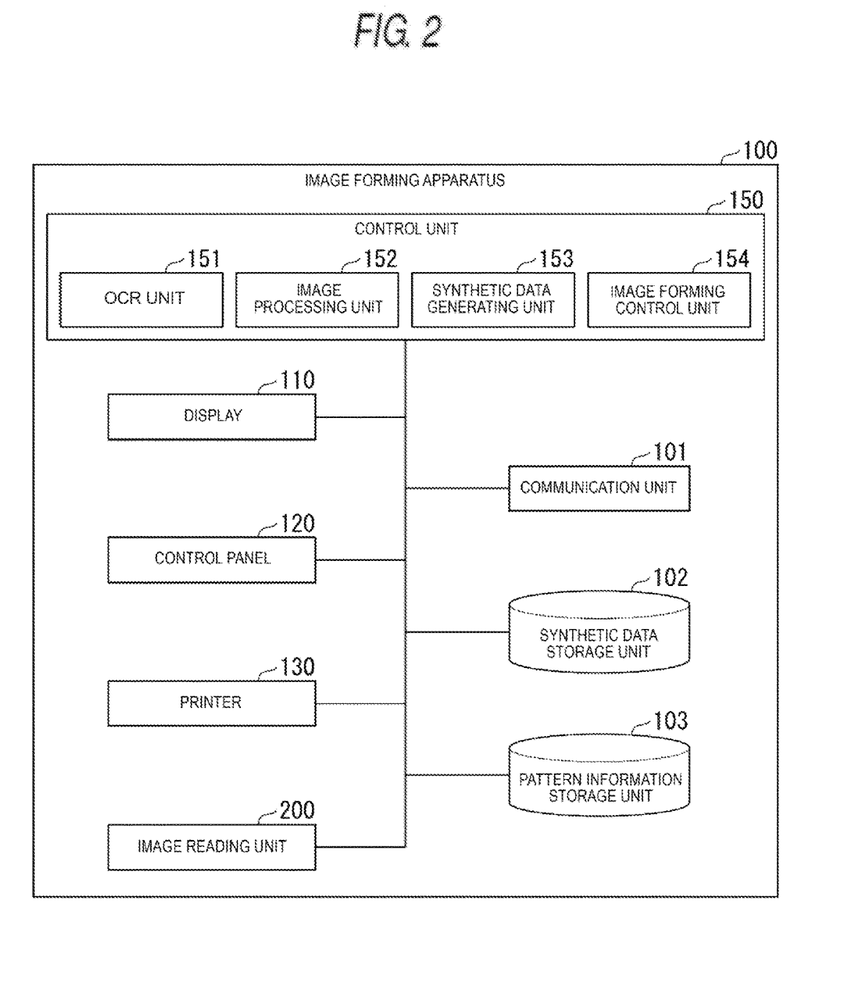
FIG. 2 is a block diagram showing a configuration of the image forming apparatus of the embodiment.

FIG. 2 is a block diagram showing a configuration of the image forming apparatus 100 of the embodiment. The image forming apparatus 100 includes a communication unit 101, a synthetic data storage unit 102, a pattern information storage unit 103, the display 110, the control panel 120, the printer 130, a control unit 150, and the image reading unit 200.

The communication unit 101 is a network interface. The communication unit 101 communicates with external terminals via a network. The communication unit 101 may communicate by a communication method such as a local area network (LAN), a public switched telephone network (PSTN), a near field communication (NFC), or the like.

The synthetic data storage unit 102 is configured using a storage device such as a magnetic hard disk device or a semiconductor storage device. The synthetic data storage unit 102 stores synthetic data. The synthetic data is data for adding a new image to the image information.

The pattern information storage unit 103 is configured using a storage device such as a magnetic hard disk device or a semiconductor storage device. The pattern information storage unit 103 stores the pattern information, the management number, and filled-in check box position information. The pattern information is image information to be added to a sheet in the case of forming an image. The management number is information that associates pattern information with synthetic data. The filled-in check box position information is position information of the check box entered by the user.

The control unit 150 controls an operation of each part of the image forming apparatus 100. The control unit 150 is executed by a device including, for example, a Central Processing Unit (CPU) and a Random Access Memory (RAM). By executing an image forming program, the control unit 150 functions as an OCR unit 151, an image processing unit 152, a synthetic data generating unit 153, and an image forming control unit 154.

The OCR unit 151 obtains the positions of characters and characters from the read image information. The OCR unit 151 generates character information from the characters. The character information is code information allocated for each character. The character information is, for example, a character code. In the present embodiment, for example, the characters are a question sentence described on a sheet.

The OCR unit 151 generates character position information from the position of the character. The character position information is information indicating the position of a character included in the image information. The OCR unit 151 outputs the character information and the character position information to the synthetic data generating unit 153.

The OCR unit 151 determines the number of questions contained in the question sheet based on the character information and the character position information. For example, when characters contained in the image information are separated by more than a predetermined distance from each other, the OCR unit 151 determines the characters as different questions from each other and counts the number of questions.

The image processing unit 152 recognizes a margin from the read image information. The margin is a region of the base of the sheet which is read, with characters or images not written. The image processing unit 152 generates margin information from the margin and outputs the margin information to the synthetic data generating unit 153.

In addition, the image processing unit 152 synthesizes the read image information with the pattern information received from the synthetic data generating unit 153 to generate printing image information. The pattern information includes, for example, a check mark indicating a correct or incorrect answer to an answer, a comment in the case of an incorrect answer, and the like. The image processing unit 152 outputs the printing image information to the image forming control unit 154.

The synthetic data generating unit 153 generates synthetic data based on the character information, the character position information, and the margin information received from the OCR unit 151 or the image processing unit 152. The processing of the synthetic data generating unit 153 is different in the case of scanning the question sheet, the case of storing the pattern information, and the case of synthesizing the pattern information.

The case of scanning the question sheet will be described. The image reading unit 200 reads the question sheet without the management number or the check box added. The synthetic data generating unit 153 determines a management number that identifies the read image information. In addition, the synthetic data generating unit 153 accepts the number of the check boxes to be added via the control panel 120. Based on the character position information, the margin information and the number of the check box, the synthetic data generating unit 153 determines the positions of the check boxes to be added to the image information (hereinafter, referred to as check box position information). The position of the check box may be determined, for example, on the margin. The synthetic data generating unit 153 stores data including the management number, the check box position information, the margin information, and the character position information as synthetic data in the synthetic data storage unit 102. The synthetic data generating unit 153 outputs the synthetic data to the image processing unit 152.

The case of storing the pattern information will be described. The image reading unit 200 scans the question sheet to which the management number, the filled-in check box, and the pattern information are added. The synthetic data generating unit 153 obtains the management number from the character information received from the OCR unit 151. The synthetic data generating unit 153 obtains the synthetic data matching a management number from the synthetic data storage unit 102. The synthetic data generating unit 153 obtains the check box position information and the character position information from the synthetic data. The synthetic data generating unit 153 obtains the filled-in box based on the check box position information. The synthetic data generating unit 153 obtains position information of the check box (hereinafter, referred to as "a filled-in check box position information") entered by the user. The synthetic data generating unit 153 obtains the pattern information. The synthetic data generating unit 153 associates the filled-in check box position information with the pattern information and the management number, and stores the information and the management number in the pattern information storage unit 103.

The case of synthesizing the pattern information will be described. The image reading unit 200 scans a question sheet with a student's answers, a management number and filled-in check boxes added. The synthetic data generating unit 153 obtains the management number from the character information received from the OCR unit 151. The synthetic data generating unit 153 obtains the synthetic data matching a management number from the synthetic data storage unit 102. The synthetic data generating unit 153 obtains the filled-in check boxes based on the check box position information included in the synthetic data. The synthetic data generating unit 153 obtains the pattern information in which a management number and filled-in check box position information match from the pattern information storage unit 103. The synthetic data generating unit 153 outputs the pattern information to the image processing unit 152.

The image forming control unit 154 performs image forming processing by controlling the printer 130. The image forming control unit 154 causes the printer 130 to form an image based on the printing image information.

Figure 3:
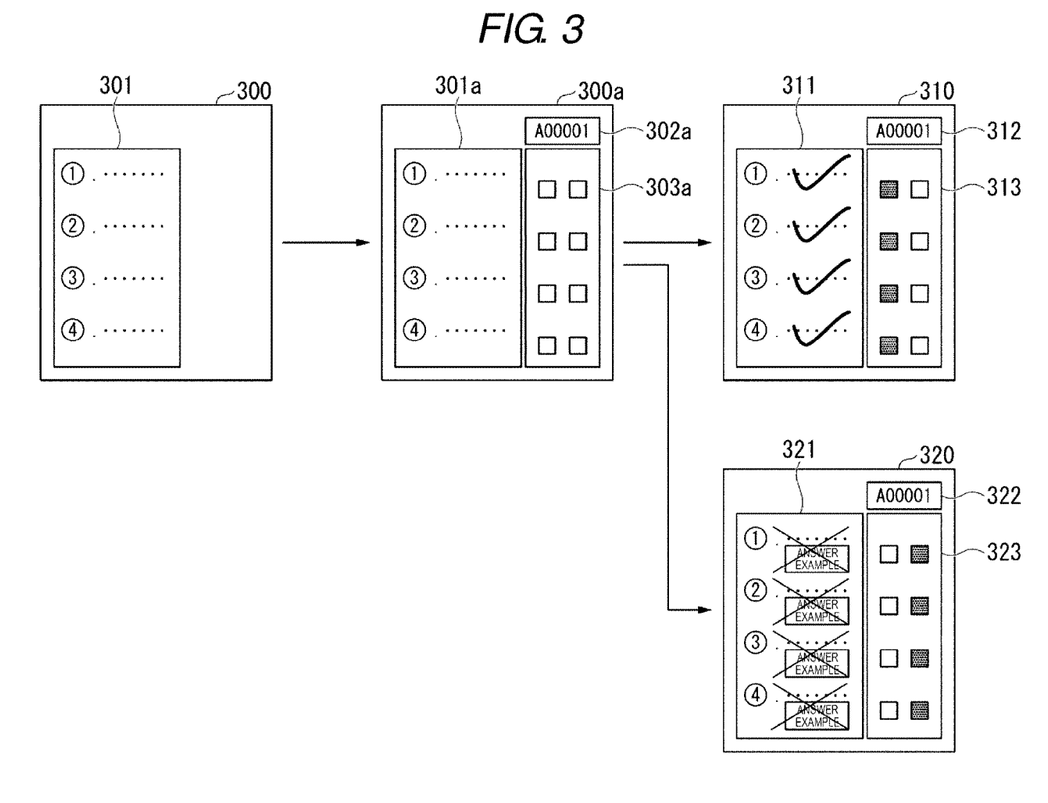
FIG. 3 is a diagram showing one specific example until pattern information described on a question sheet is stored.

FIG. 3 is a diagram showing one specific example until the pattern information described in the question sheet is stored. A region 300 is one specific example of the question sheet before check boxes and management number are added. The question sheet has a region 301. The region 301 contains characters such as question sentences. The image reading unit 200 scans the question sheet and generates image information. The printer 130 of the image forming apparatus 100 forms an image in which a management number and check boxes are added to the read image information.

A region 300a is one specific example of the question sheet after the image of the check boxes and the management number are added. The region 300a includes the region 301a, a region 302a, and a region 303a. The region 301a contains characters such as the same question sentences as in the region 301. The region 302a indicates a management number. As an example, the region 302a shows "A00001" as the management number. The management number is determined by the synthetic data generating unit 153. The region 303a indicates check boxes. Check boxes are generated by the synthetic data generating unit 153. Check boxes are generated for respective questions based on the number of the check boxes received from the user via the control panel 120.

The user (for example, a school teacher) fills in the pattern information and fills the check boxes in the question sheet to which the management number and the check boxes are added in order to generate verification data. A region 310 and a region 320 are the question sheets entered by the user. The region 310 includes a region 311, a region 312, and a region 313. The region 311 shows a case where all the answers described in the region 311 are correct answers. The region 311 includes characters such as question sentences and pattern information. The pattern information described in the region 311 is pattern information to be synthesized when the check boxes described in the left column of the region 313 are filled. The pattern information corresponds to the check boxes. That is, the pattern information described in the region 311 and the fill information of the check boxes in the left column of the region 313 are associated with each other. The region 312 indicates a management number. The region 313 is the filled-in check boxes. Accordingly, when the question sheet in the region 310 is scanned, "A00001" as the management number, the check boxes in the left column as the filled-in check box position information, and the pattern information corresponding to the check boxes as the pattern information when the check boxes in the left column are checked (specifically, "a checked mark") are stored in the pattern information storage unit 103.

On the other hand, the region 320 shows a case where all the answers described in the region 320 are incorrect. The region 320 includes a region 321, a region 322, and a region 323. The region 321 contains characters such as question sentences and pattern information. The pattern information described in the region 321 indicates the pattern information to be synthesized when the check boxes described in the right column of the region 320 are filled. The pattern information corresponds to the check boxes. That is, the pattern information described in the region 321 and the fill information of the check boxes in the left column of the region 323 are associated with each other. The region 322 indicates a management number. The region 323 is the filled-in check boxes. Accordingly, when the question sheet in the region 320 is scanned, "A00001" as the management number, the check boxes in the right column as the filled-in check box position information, and the pattern information corresponding to the check boxes as the pattern information when the check boxes in the right column are checked (specifically, "an answer example") are stored in the pattern information storage unit 103.

Figure 4:
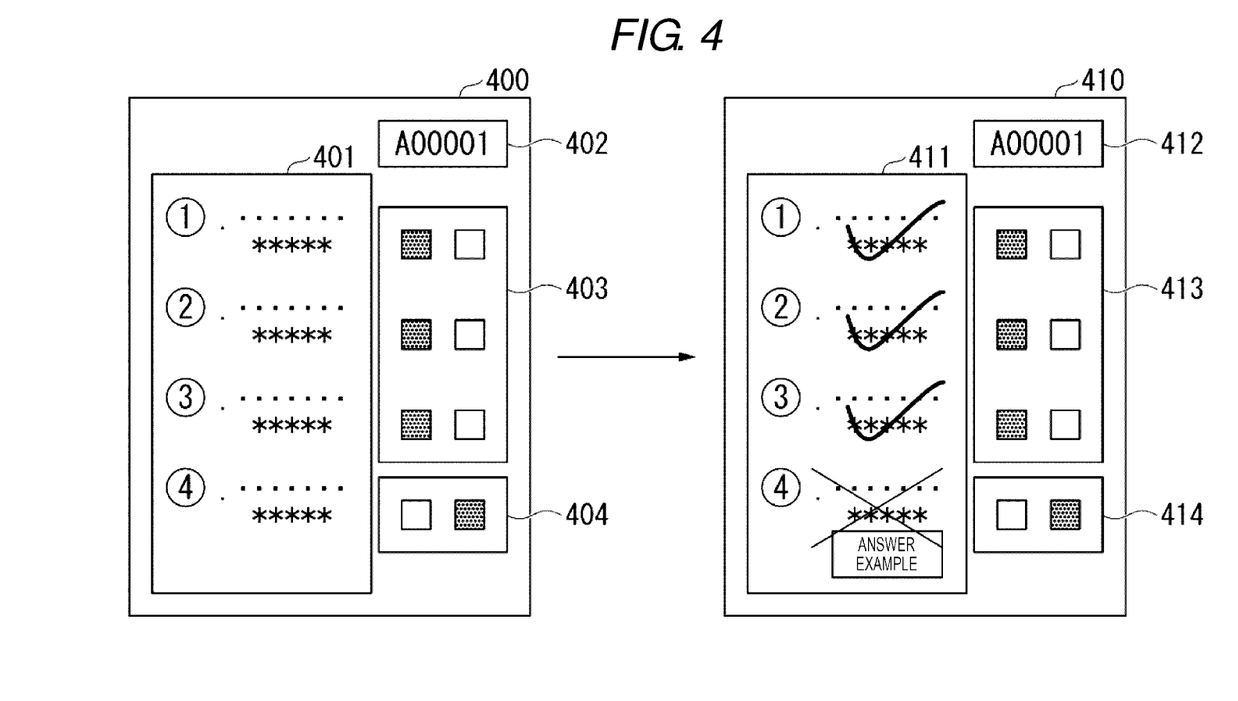
FIG. 4 is a diagram showing one specific example when the pattern information is synthesized to the question sheet.

FIG. 4 is a diagram showing one specific example when the pattern information is synthesized to the question sheet. A region 400 is one specific example of the question sheet. The question sheet has a region 401, a region 402, a region 403 and a region 404. The region 401 contains characters such as question sentences and answers by a student. The region 402 indicates a management number. The region 403 is the filled-in check boxes filled in the left column. The region 404 is the filled-in check boxes filled in the right column. The filled-in check boxes are filled in by a school teacher who has collected the question sheet. For example, when an answer by the student is correct, the check box in the left column is filled. When an answer by the student is incorrect, the check box in the right column is filled.

In the region 401, pattern information is synthesized based on the filled-in check boxes in the regions 403 and 404. A region 410 is one specific example of the question sheet (hereinafter, referred to as "a question sheet after synthesis") in which the pattern information is synthesized. The question sheet after synthesis has a region 411, a region 412, a region 413 and a region 414. The region 411 contains question sentences and the pattern information synthesized with characters such as answers written by the student. The region 412 indicates a management number. The region 413 is the filled-in check boxes filled in the left column. When the check boxes in the left column are filled in, the pattern information corresponding to the filled-in check box position information in the left column is synthesized. Specifically, marks indicating correct answers are synthesized in ① to ③ of the region 411, and "marks indicating incorrect answers and the answer example" are synthesized in ④. The region 414 is the filled-in check boxes filled in the right column. When check boxes in the right column are filled in, the pattern information corresponding to the filled-in check box position information in the right column is synthesized.

Figure 5:
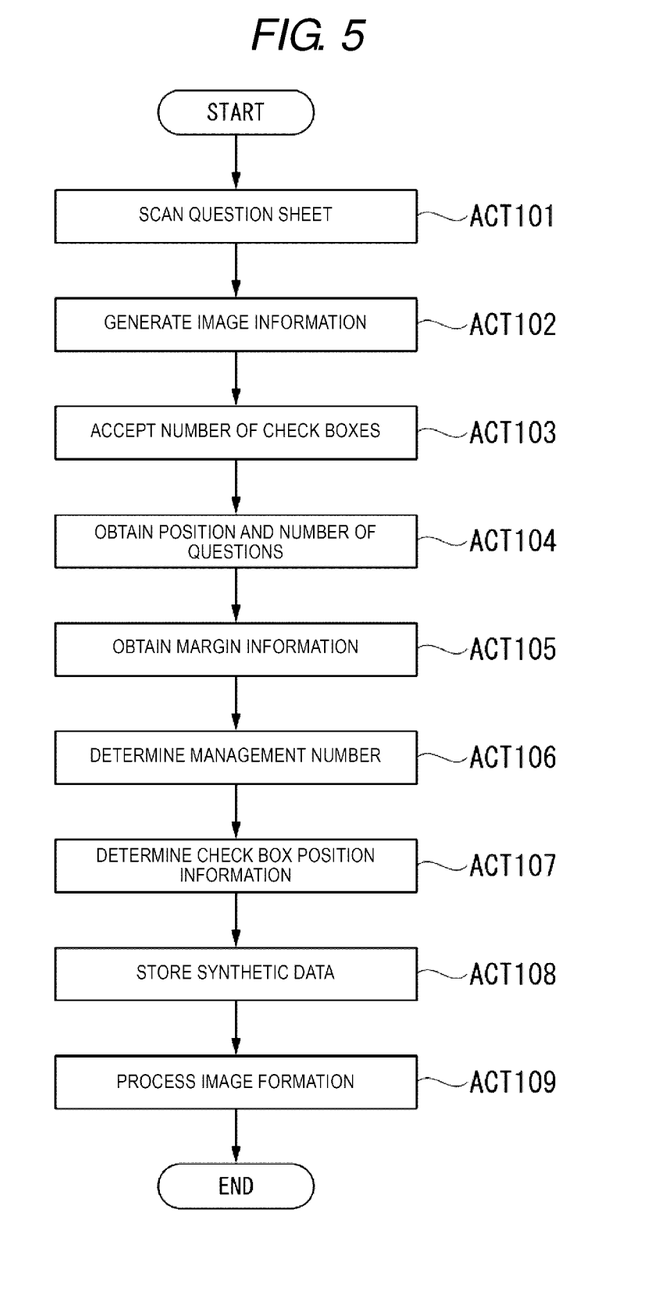
FIG. 5 is a flowchart showing a flow of processing when a check box is added to the question sheet.

FIG. 5 is a flowchart showing a flow of processing when a check box is added to the question sheet. When a check box is added, the management number and the question sheet to which a check box is not added (for example, the question sheet shown in the region 300 in FIG. 3) are read. The image reading unit 200 of the image forming apparatus 100 scans the sheet (ACT 101). The image reading unit 200 generates image information based on the scanned data (ACT 102). The control panel 120 of the image forming apparatus 100 accepts the number of the check boxes from the user (ACT 103). The OCR unit 151 of the image forming apparatus 100 obtains the character position information and the number of questions from the image information (ACT 104). The image processing unit 152 of the image forming apparatus 100 obtains the margin information from the image information (ACT 105).

The synthetic data generating unit 153 of the image forming apparatus 100 determines the management number identifying the image information (ACT 106). Based on the margin information and the number of the check boxes, the synthetic data generating unit 153 determines the check box position information in the margin of the image information (ACT 107). The synthetic data generating unit 153 stores synthetic data including the management number, the check box position information, the margin information, and the character position information in the synthetic data storage unit 102 (ACT 108). The image forming control unit 154 of the image forming apparatus 100 performs image forming processing based on the printing image information where the image information and the synthetic data are synthesized (ACT 109).

Figure 6:
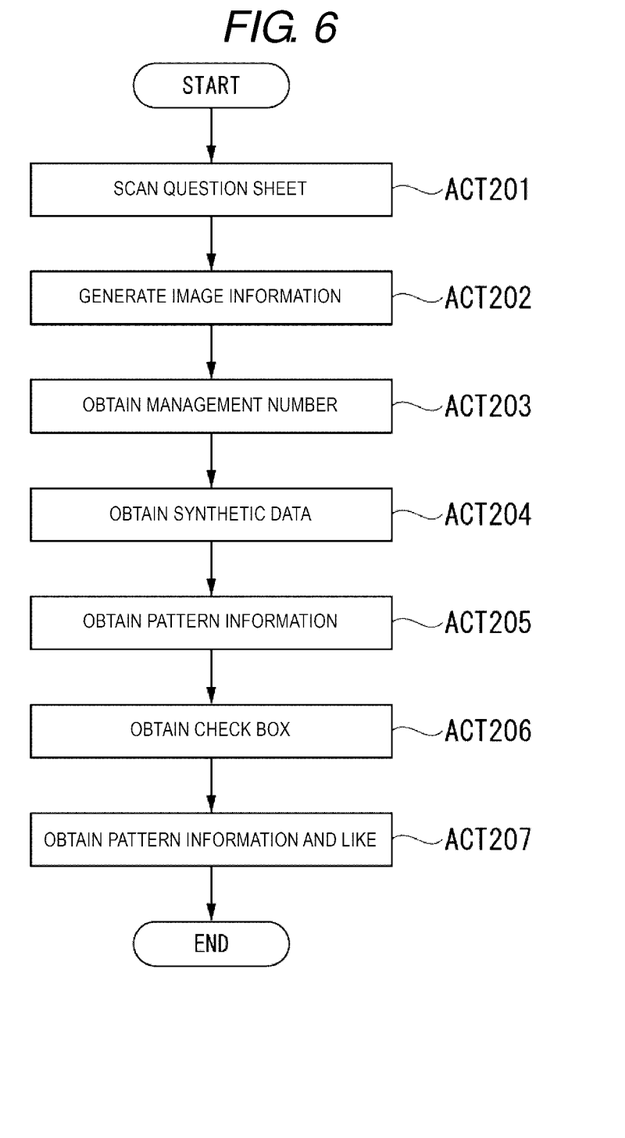
FIG. 6 is a flowchart showing a flow of processing when the pattern information is stored in the image forming apparatus.

FIG. 6 is a flowchart showing a flow of processing when the pattern information is stored in the image forming apparatus 100. When the pattern information is stored, the question sheet to which the management number and the filled-in check boxes are added (for example, the question sheet shown in the region 310 or the region 320 in FIG. 3) is read. The image reading unit 200 of the image forming apparatus 100 scans the question sheet (ACT 201). The image reading unit 200 generates image information based on the scanned data (ACT 202). The OCR unit 151 obtains the management number and the character information from the image information (ACT 203).

The synthetic data generating unit 153 obtains the synthetic data matching a management number from the synthetic data storage unit 102 (ACT 204). The synthetic data generating unit 153 obtains the pattern information based on the character position information included in the synthetic data and the character information included in the image information (ACT 205). Based on the check box position information included in the synthetic data, the synthetic data generating unit 153 obtains the check boxes included in the image information and generates filled-in check box position information (ACT 206). The synthetic data generating unit 153 stores the management number, the pattern information and the filled-in check box position information in the pattern information storage unit 103 (ACT 207).

Figure 7:
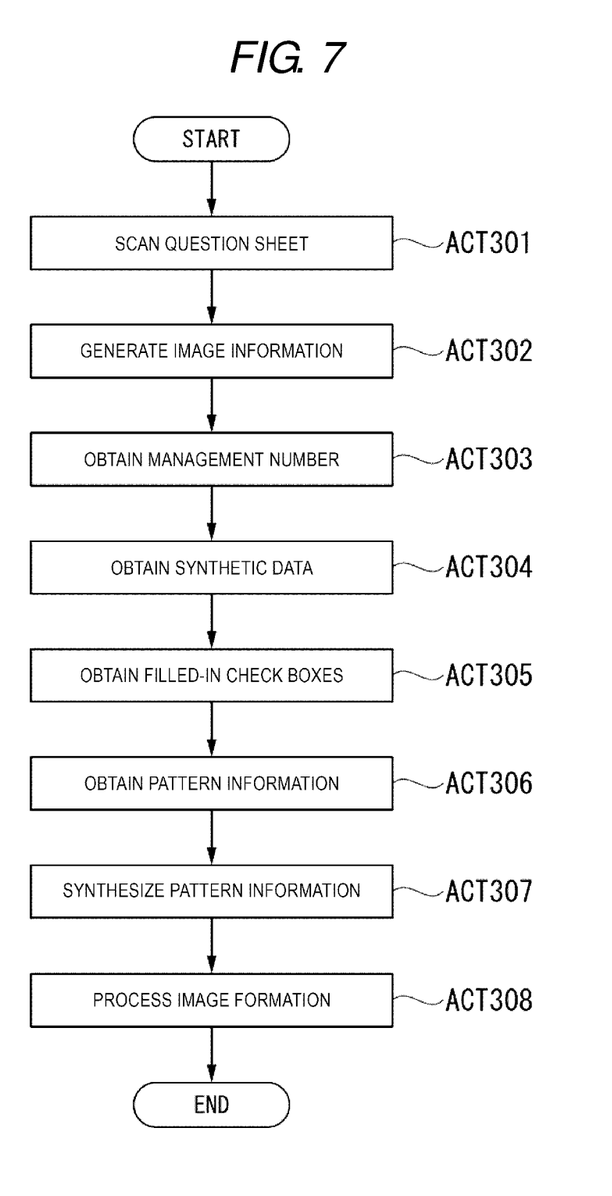
FIG. 7 is a flowchart showing a flow of processing when the pattern information is synthesized to the question sheet.

FIG. 7 is a flowchart showing a flow of processing when the pattern information is synthesized to the question sheet. When the pattern information is synthesized, the question sheet (for example, the question sheet shown in the region 400 in FIG. 4) to which the answers by the student, the management number, and the filled-in check boxes are added is read. The image reading unit 200 of the image forming apparatus 100 scans the question sheet (ACT 301). The image reading unit 200 generates image information based on the scanned data (ACT 302). The OCR unit 151 obtains the management number and the character information from the image information (ACT 303).

The synthetic data generating unit 153 obtains the synthetic data matching a management number from the synthetic data storage unit 102 (ACT 304). Based on the check box position information included in the synthetic data, the synthetic data generating unit 153 obtains the filled-in check boxes from the image information and generates filled-in check box position information (ACT 305). The synthetic data generating unit 153 obtains the pattern information based on the management number and the filled-in check box position information from the pattern information storage unit 103 (ACT 306). The image processing unit 152 synthesizes the image information and the pattern information to generate printing image information (ACT 307). The image forming control unit 154 performs image forming processing based on the printing image information (ACT 308).

In the image forming apparatus 100 configured as described above, the synthetic data generating unit 153 obtains the pattern information based on the filled-in check boxes and the management number described in the read image information. The image forming control unit 154 synthesizes the pattern information and the image information to generate printing image information indicating a graded answer sheet. The printer 130 forms an image of the graded answer sheet based on the printing image information. Accordingly, in the image forming apparatus 100 of the present embodiment, it is possible to score without recognizing handwritten characters and to prevent reading errors.

When the image forming control unit 154 prints the pattern information, the pattern information may be enlarged or reduced and printed on the sheet. With such a configuration, even when the margin of the answer sheet is small, it is possible to print the pattern information on the sheet.

When the image forming control unit 154 generates printing image information indicating the graded answer sheet, printing image information may be generated so that the check boxes are not printed. With such a configuration, even when the margin of the answer sheet is small, it is possible to print the pattern information on the sheet without reducing the pattern information.

The synthetic data generating unit 153 may calculate statistical information based on the obtained filled-in check boxes. The statistical information may be information such as benefits, average points or deviation values, for example. With such a configuration, it is possible to score more efficiently.

The synthetic data generating unit 153 may stop the processing and output warning information when the obtained filled-in check boxes are not normally checked. The case where the filled-in check boxes are not normally checked may be, for example, a case where there are check boxes which are not filled on the answer sheet, a case where there are check boxes which are excessively filled on the answer sheet, or a case where the check boxes are not filled in. The case where the filled-in check boxes are not normally checked may be, for example, a case where the image forming apparatus 100 cannot read checks because checks are so thin. The case where there are check boxes which are excessively filled is a case where the user fills in two or more check boxes when the user is supposed to fill in one check box, for example. The warning information may be, for example, an alarm sound or a message indicating that the display 110 is defective. With such a configuration, it is possible to prevent redoing of the scoring. The invention described in the present embodiment is not limited to use for scoring questions. The present embodiment can be implemented in various other forms.

While certain embodiments have been described, these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
   an image reading unit configured to read an image on a sheet;
   a processor that executes computer executable units, wherein the computer executable units comprise:
   a synthetic data generating unit configured to obtain a check box associated with the sheet and a management number for identifying image information from the image read on the sheet and obtain pattern information based on the check box and the management number; and
   an image forming control unit configured to generate printing image information in which the pattern information is added to the image read on the sheet; and
   a printer configured to perform image formation based on the printing image information,
   wherein the image forming control unit deletes the check box from the sheet to generate the printing image information.

2. The apparatus according to claim 1,
   wherein the image forming control unit adds pattern information enlarged or reduced in size to the sheet to generate the printing image information.

3. The apparatus according to claim 1, further comprising:
   a pattern information storage unit,
   wherein the image reading unit reads a sheet comprising the pattern information, and the synthetic data generating unit stores the pattern information included in the sheet in the pattern information storage unit.

4. The apparatus according to claim 1, further comprising:
   a pattern information storage unit,
   wherein the image reading unit reads a sheet comprising the check box and the pattern information, and the synthetic data generating unit stores position information indicating a position of the check box included in the sheet and the pattern information in association with each other in the pattern information storage unit.

5. The apparatus according to claim 1,
wherein the synthetic data generating unit outputs warning information when a condition indicating that the check box is not normally checked is satisfied.

6. The apparatus according to claim 5, further comprising:
a display configured to display the warning information.

7. The apparatus according to claim 1, further comprising:
a pattern information storage unit that stores the pattern information,
wherein the synthetic data generating unit obtains the pattern information from the pattern information storage unit.

8. The apparatus according to claim 1, further comprising:
a pattern information storage unit that stores the pattern information,
wherein the synthetic data generating unit stores the pattern information in the pattern information storage unit when the image reading unit reads a sheet on which the pattern information is described.

9. An image forming method comprising:
reading an image on a sheet;
obtaining a check box associated with the sheet and a management number for identifying image information from the image read on the sheet and obtaining pattern information based on the check box and the management number;
generating printing image information in which the pattern information is added to the image read on the sheet;
deleting the check box from the sheet to generate the printing image information; and
forming an image based on the printing image information.

10. The method according to claim 9, further comprising:
adding pattern information enlarged or reduced in size to the sheet to generate the printing image information.

11. The method according to claim 9, further comprising:
reading a sheet comprising the pattern information, and storing the pattern information included in the sheet in a pattern information storage unit.

12. The method according to claim 9, further comprising:
reading a sheet comprising the check box and the pattern information, and
storing position information indicating a position of the check box included in the sheet and the pattern information in association with each other in a pattern information storage unit.

13. The method according to claim 9, further comprising:
outputting warning information when a condition indicating that the check box is not normally checked is satisfied.

14. The method according to claim 13, further comprising:
displaying the warning information.

15. The method according to claim 9, further comprising:
storing the pattern information; and
obtaining the pattern information from a pattern information storage unit.

16. The method according to claim 9, further comprising:
storing the pattern information; and
storing the pattern information in a pattern information storage unit when reading the sheet on which the pattern information is described.

17. A multi-function peripheral, comprising:
means for reading an image on a sheet;
means for obtaining a check box associated with the sheet and a management number for identifying image information from the image read on the sheet and obtaining pattern information based on the check box and the management number;
means for generating printing image information in which the pattern information is added to the image read on the sheet;
means for deleting the check box from the sheet to generate the printing image information; and
means for forming an image based on the printing image information.

18. The multi-function peripheral according to claim 17, further comprising:
means for adding pattern information enlarged or reduced in size to the sheet to generate the printing image information.

* * * * *